United States Patent
Ihm et al.

(10) Patent No.: US 7,725,796 B2
(45) Date of Patent: May 25, 2010

(54) ALLOCATING DATA BURSTS AND SUPPORTING HYBRID AUTO RETRANSMISSION REQUEST IN ORTHOGONAL FREQUENCY DIVISION MULTIPLEXING ACCESS RADIO ACCESS SYSTEM

(75) Inventors: Bin Chul Ihm, Anyang-si (KR); Chang Jae Lee, Cheonan-si (KR); Yong Suk Jin, Anyang-si (KR); Jin Young Chun, Seoul (KR); Ae Ran Youn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1141 days.

(21) Appl. No.: 11/320,374

(22) Filed: Dec. 27, 2005

(65) Prior Publication Data

US 2006/0184854 A1    Aug. 17, 2006

(30) Foreign Application Priority Data

Dec. 27, 2004   (KR) ............... 10-2004-0112926
Dec. 27, 2004   (KR) ............... 10-2004-0112929

(51) Int. Cl.
*H03M 13/00* (2006.01)
*H04L 1/18* (2006.01)
(52) U.S. Cl. .............. 714/751; 370/208
(58) Field of Classification Search .......... 370/208, 370/329; 714/751
See application file for complete search history.

(56) References Cited

U.S. PATENT DOCUMENTS 7,339,949 B2 * 3/2008 Suzuki et al. ............ 370/468
2003/0043764 A1   3/2003 Kim et al.
2004/0062193 A1 * 4/2004 Ma et al. ................. 370/208
2006/0045001 A1 * 3/2006 Jalali ........................ 370/208
2007/0255993 A1 * 11/2007 Yap et al. .................. 714/748

FOREIGN PATENT DOCUMENTS

JP    10-075228    3/1998

OTHER PUBLICATIONS

Gidlund, M., et al.: "Enhanced HARQ Scheme based on Rearrangement of Signal Constellations and Frequency Diversity for OFDM Systems." 59th Vehicular Technology Conference, vol. 1, May 17-19, 2004; pp. 500-504. Sections II and III.
Oteng-Amoako, K. et al.: "Adaptive Turbo-Coded Hybrid-ARQ in OFDM Systems Over Fading Channels." IEEE 60th Vehicular Technology Conference, vol. 3, Sep. 26-29, 2004; pp. 1996-2000. Section I.
Liyu Cai et al.: "Improved HARQ Scheme Using Channel Quality Feedback for OFDM Systems." IEEE 60th Vehicular Technology Conference, vol. 4, May 17-19, 2004; pp. 1869-1872, Section II.

* cited by examiner

*Primary Examiner*—Sam Rizk
(74) *Attorney, Agent, or Firm*—Lee, Hong, Degerman, Kang & Waimey

(57) ABSTRACT

The present invention relates to allocating data regions in an orthogonal frequency division multiplexing access system. The present invention comprises receiving a message comprising information for locating a data region of a data map allocated to a mobile station identified in the message for transmitting and receiving information, and identifying the data region of the data map allocated to the identified mobile station by reading the received message, wherein the data region is identified independent of identifying data regions of another data map.

14 Claims, 17 Drawing Sheets

FIG. 10A
Priro Art

| | |
|---|---|
| MAP Message #1 | burst #1 {MSS#1, duration=3, ...}<br>burst #2 {MSS#2, duration=4, ...} |
| MAP Message #2 | burst #3 {MSS#3, duration=8, ...}<br>burst #4 {MSS#4, duration=15, ...} |
| MAP Message #3 | burst #5 {MSS#5, duration=7, ...}<br>burst #6 {MSS#6, duration=3, ...}<br>burst #7{MSS#7, duration=4, ...} |

FIG. 11A
Prior Art

MAP Message #1 burst #1 {MSS#1, duration=3, ...}
burst #2 {MSS#2, duration=4, ...}

MAP Message #2 burst #3 {MSS#3, duration=8, ...}
burst #4 {MSS#6, duration=8, ...}
burst #5{MSS#5, duration=13, ...}

FIG. 12

MAP Message #1

Start Offset = 1
burst #1 {MSS#1, duration=4, ...}
burst #2 {MSS#2, duration=15, ...}

MAP Message #2

Start Offset = 20
burst #3 {MSS#3, duration=8, ...}
burst #4 {MSS#4, duration=8, ...}
burst #5 {MSS#5, duration=13, ...}

FIG. 13

MAP Message #1

Symbol offset = 1
Subchannel offset = 1
burst #1 {MSS#1, duration=4, ...}
burst #2 {MSS#2, duration=15, ...}

MAP Message #2

Symbol offset = 4
Subchannel offset = 2
burst #3 {MSS#3, duration=8, ...}
burst #4 {MSS#4, duration=8, ...}
burst #5 {MSS#5, duration=13, ...}

FIG. 14

MAP Message #1
```
ACK Offset =1
burst #1 {MSS#1, duration=3, ...}
burst #2 {MSS#2, duration=4, ...}
```

MAP Message #2
```
ACK Offset =3
burst #3 {MSS#3, duration=8, ...}
burst #4 {MSS#4, duration=15, ...}
```

MAP Message #3
```
ACK Offset =5
burst #5 {MSS#5, duration=7, ...}
burst #6 {MSS#6, duration=3, ...}
burst #7 {MSS#7, duration=4, ...}
```

FIG. 15

MAP Message #1
```
Burst Number = 1
burst #1 {MSS#1, duration=3, ...}
burst #2 {MSS#2, duration=4, ...}
```

MAP Message #2
```
Burst Number = 3
burst #3 {MSS#3, duration=8, ...}
burst #4 {MSS#4, duration=15, ...}
```

MAP Message #3
```
Burst Number = 5
burst #5 {MSS#5, duration=7, ...}
burst #6 {MSS#6, duration=3, ...}
burst #7 {MSS#7, duration=4, ...}
```

FIG. 16

| | |
|---|---|
| MAP Message #1 | Symbol Offset = 1<br>Half subchannel offset = 1<br>burst #1 {MSS#1, duration=3, ...}<br>burst #2 {MSS#2, duration=4, ...} |
| MAP Message #2 | Symbol Offset = 3<br>Half subchannel offset = 1<br>burst #3 {MSS#3, duration=8, ...}<br>burst #4 {MSS#4, duration=15, ...} |
| MAP Message #3 | Symbol Offset = 6<br>Half subchannel offset = 1<br>burst #5 {MSS#5, duration=7, ...}<br>burst #6 {MSS#6, duration=3, ...}<br>burst #7{MSS#7, duration=4, ...} |

ALLOCATING DATA BURSTS AND SUPPORTING HYBRID AUTO RETRANSMISSION REQUEST IN ORTHOGONAL FREQUENCY DIVISION MULTIPLEXING ACCESS RADIO ACCESS SYSTEM

CROSS-REFERENCE TO RELATED APPLICATIONS

Pursuant to 35 U.S.C. §119(a), this application claims the benefit of earlier filing date and right of priority to Korean Application No. 10-2004-0112926, filed on Dec. 27, 2004 and Korean Application No. 10-2004-0112929, filed on Dec. 27, 2004, the contents of which are hereby incorporated by reference herein in their entirety.

FIELD OF THE INVENTION

The present invention relates to an orthogonal frequency division multiplexing access (OFDMA) radio access system, and more particularly, to allocating data bursts and supporting hybrid automatic retransmission request (HARQ) in the OFDMA radio access system. Although the present invention is suitable for a wide scope of applications, it is preferably suitable for reducing troublesomeness in checking all messages including a previous message to grasp a transmission location of an ACK/NACK signal allocated to a mobile subscriber station for lowering the possibility of error generation. The present invention is also preferably suitable for solving a problem wherein an error occurs consecutively at an allocation location of a subsequent data burst due to the error occurring in the middle of allocating the data bursts accumulatively.

BACKGROUND OF THE INVENTION

Generally, an ARQ (automatic repeat request) is a response message notified by a receiving side to a transmitting side after receiving data transmitted from the transmitting side to inform whether the data was correctly received. The ARQ may be classified according to the three systems shown in FIGS. 1A to 1C, respectively.

FIG. 1A shows a 'stop-and-wait' ARQ system, in which a transmitting side waits after data transmission to receive an ACK or NACK message. The transmitting side then sends new data or retransmits former data.

FIG. 1B shows a 'go-back-N' ARQ system, in which a transmitting side continuously transmits data regardless of a response from a receiving side. After receiving a NACK signal, the transmitting side retransmits data from a corresponding portion.

FIG. 1C shows a 'selective-repeat' ARQ system, in which a transmitting side continuously transmits data regardless of a response from a receiving side. After receiving a NACK signal, the transmitting side retransmits the data corresponding to the received NACK signal only.

HARQ (hybrid ARQ) is proposed to solve a problem occurring when a larger error occurs over a channel as a higher coding rate (Rc=⅚, ¾), a high-order modulation (Mod=16-QAM, 64-QAM) and the like are selected due to a demand for a data rate over 2 Mbps, 10 Mbps or higher in a packet transmission communication system.

The erroneous data in transmission is stored in a buffer to have FEC (forward error correction) applied thereto by being combined with retransmitted information in the HARQ system. In contrast, the erroneous data in transmission is discarded in the ARQ system. The HARQ system is a type of system generated from combining FEC and ARQ together. Moreover, the HARQ can be mainly classified into the following four systems.

In the first system, Type I HARQ system shown in FIG. 2, data is always attached to an error detection code to preferentially detect FEC (forward error correction). If there still remains an error in a packet, retransmission is requested. An erroneous packet is discarded and a retransmitted packet is used with a same FEC code.

In the second system, Type II HARQ system called IR ARQ (incremental redundancy ARQ) shown in FIG. 3, an erroneous packet is not discarded but is stored in a buffer to be combined with retransmitted redundancy bits. In retransmission, parity bits except data bits are retransmitted only. The retransmitted parity bits are changed each retransmission.

In the third system, a Type III HARQ system shown in FIG. 4, which is a special case of the Type II HARQ system, each packet is self-decodable. The packet is configured with an erroneous part and data to be retransmitted. This system is more accurately decodable than the Type II HARQ system but is disadvantageous in the aspect of coding gain.

In the fourth system, a 'Type I with soft combining' HARQ system shown in FIG. 5, a function of data initially received and stored by a transmitting side with retransmitted data is added to the Type I HARQ system. The 'Type I with soft combining' HARQ system is called a metric combining or a chase combining system. This system is advantageous in the aspect of signal to interference plus noise ratio (SINR) and always uses the same parity bits of the retransmitted data.

Recently, many efforts have been made to research and develop OFDM (orthogonal frequency division multiplexing) or OFDMA (orthogonal frequency division multiplexing access) suitable for high-speed data transmission over a wired/wireless channel. In OFDM, frequency use efficiency is raised using a plurality of carrier waves having mutual orthogonality. A process of modulating/demodulating a plurality of the carrier waves in a transmission/reception has the same result as performing IDFT (inverse discrete Fourier transform)/DFT (discrete Fourier transform) and can be implemented at a high speed using IFFT (inverse fast Fourier transform)/FFT (fast Fourier transform).

A principle of the OFDM is to reduce relative dispersion in a time domain by multi-path delay spread in a manner of increasing a symbol duration by dividing a high-speed data stream into a plurality of low-speed data streams and by simultaneously transmitting a plurality of the low-speed data streams using a plurality of subcarriers. And, a transmission of data by the OFDM uses a transmission symbol as a unit.

Since the modulation/demodulation in the OFDM can be collectively handled for all subcarriers using DFT (discrete Fourier transform), it is unnecessary to design a modulator/demodulator for each of the individual subcarriers.

FIG. 6 illustrates a configuration of an orthogonal frequency division multiplexing (OFDM) modulator/demodulator. Referring to FIG. 6, a serially inputted data stream is transformed into parallel data streams amounting to the number of subcarriers. Inverse discrete Fourier transform (IDFT) is carried out on each of the parallel data streams. For fast data processing, IFFT (inverse fast Fourier transform) is used. The inverse-Fourier-transformed data is then converted to serial data again to be transmitted through frequency conversion. A receiving side receives the corresponding signal to demodulate through a reverse process.

In a mobile communication system, resources include frequency channels, i.e., frequency bands. Multiple access is a methodology of allocating the limited frequency bands to users for efficient use. Duplexing is a connection methodology of identifying an uplink (UL) connection and a downlink (DL) connection in bidirectional communication. Radio multiple access and multiplexing systems are the basic platform technology of the radio transmission to use the limited frequency resource efficiently and depend on an assigned frequency band, the number of users, a data rate, mobility, a cell structure, a radio environment, etc.

OFDM (orthogonal frequency division multiplexing), which is a sort of MCM (multicarrier transmission/modulation) system that uses several carriers, is a system that parallels input data as many as the number of used carriers to transmit the data loaded on the corresponding carriers. The OFDM is a strong candidate for a radio transmission technology meeting the requirements of a fourth generation mobile communication infrastructure and can be classified into OFDM frequency division multiple access (OFDM-FDMA), OFDM time division multiple access (OFDM-TDMA) and OFDM code division multiple access (OFDM-CDMA) according to a user's multiple access system. Each of the OFDM-FDMA, OFDM-TDMA and OFDM-CDMA systems has its merits and demerits. Moreover, schemes exist to compensate for the demerits.

The OFDM-FDMA (OFDMA), which is suitable for a fourth generation macro/micro cellular infrastructure, has no intra-cell interference, a high efficiency of frequency reuse and excellent adaptive modulation and granularity. Using dispersed frequency hopping, multiple antennas, powerful encoding and the like to compensate for the demerits of the OFDM-FDMA, diversity can be raised and the influence of inter-cell interference can be reduced. The OFDMA can efficiently distribute resources by allocating the number of subcarriers differently according to a data rate requested by each user. Furthermore, the OFDMA can raise the transmission efficiency since it is unnecessary for each user to perform initialization using a preamble prior to data reception like OFDM-TDMA. In particular, the OFDMA, which is suitable for a case using numerous subcarriers (e.g., a case wherein an FFT size is large), is efficiently applied to a radio communication system having a relatively wide cell area. Also, the frequency-hopping OFDMA system is used in raising a frequency diversity effect and obtaining an intermediate interference effect by overcoming a case where a subcarrier in deep fading exists in a radio channel or a case where there exists subcarrier interference caused by another user. FIG. 6 shows the OFDMA system, in which an allocated grid performs frequency-hopping in a frequency domain according to a time slot.

FIG. 7 is a structural diagram of a data frame in an OFDMA radio communication system according to the related art. Referring to FIG. 7, a horizontal axis is a time axis represented by a symbol unit and a vertical axis is a frequency axis represented by a subchannel unit. The subchannel refers to a bundle of a plurality of subcarriers. In particular, in an OFDMA physical layer, active carriers are divided into groups to be transmitted to different receiving ends, respectively. Thus, the group of subcarriers transmitted to one receiving end is called a subchannel. In this case, the carriers configuring the subchannel can be adjacent to each other or can be spaced uniformly apart from each other.

A slot allocated to each user, as shown in FIG. 7, is defined by a data region of a two-dimensional space, which is a set of consecutive subchannels allocated by a burst. In the OFDMA, one data region, as shown in FIG. 7, can be represented as a rectangle determined by time and subchannel coordinates. Such a data region can be allocated to a specific user's uplink. Also, a base station can transmit such a data region to a specific user in downlink.

In the related art OFDM/OFDMA radio communication system, in case that data exists to be transmitted to a mobile subscriber station (MSS), a base station (BS) allocates a data region to be transmitted via a DL-MAP (downlink-MAP). The mobile subscriber station receives the data via the allocated region (DL bursts #1 to #5 in FIG. 7).

In FIG. 7, a downlink subframe starts with a preamble used for synchronization and equalization in a physical layer and a structure of an entire frame is defined via broadcast-formatted downlink MAP (DL-MAP) and uplink-MAP (UL-MAP) messages defining locations and usages of bursts allocated to the uplink and downlink, respectively.

The DL-MAP message defines the usage allocated per burst to a downlink interval in a burst-mode physical layer, and the UL-MAP message defines the usage of the burst allocated to an uplink interval. In an information element (IE) configuring the DL-MAP message, a downlink traffic interval is identified on a user end by DIUC (downlink interval usage code) and position information (e.g., subchannel offset, symbol offset, subchannel number, symbol number) of the burst. Meanwhile, in an information element configuring the UL-MAP message, the usage is determined by UIUC (uplink interval usage code) per CID (connection ID) and a position of a corresponding interval is regulated by 'duration'. In this case, the usage per interval is determined according to a value of the UIUC used in the UL-MAP. Each interval starts from a point having a distance away from a previous IE start point, wherein the distance is as far as the 'duration' regulated by the UL-MAP IE.

A DCD (downlink channel descriptor) message and a UCD (uplink channel descriptor) message include modulation types, FEC code types and the like as physical layer associated parameters to be applied to the burst intervals allocated to the downlink and the uplink, respectively. Also, necessary parameters (e.g., K, R, etc. of R-S code) according to various forward error correction code types are provided. These parameters are given by burst profiles provided for the UIUC (uplink interval usage code) and DIUC (downlink interval usage code) in the UCD and DCD, respectively.

In the OFDMA communication system, the burst allocating method can be classified into a general MAP method and a HARQ method according to whether the HARQ system is supported.

The burst allocating method of the general MAP in downlink teaches a rectangular shape, as shown in FIG. 7, configured with time and frequency axes. Namely, it teaches a start symbol number (symbol offset), a start subchannel number (subchannel offset), the number of used symbols (No. OFDMA symbols) and the number of used subchannels (No. Subchannels). Since a method of allocating bursts to a symbol axis sequentially is used in the uplink, uplink bursts can be allocated by teaching the number of the used symbols only.

FIG. 8 is a diagram of a data frame according to a HARQ MAP. Referring to FIG. 8, in the HARQ MAP, a method of allocating bursts along a subchannel (subcarrier) axis sequentially is used in both uplink and downlink, which is different from that of a general MAP. In the HARQ MAP, a length of a burst is informed only. In this method, bursts, as shown in FIG. 8, are sequentially allocated. A start position of a burst corresponds to a position where a previous burst ends and occupies a radio resource amounting to an allocated length from the start position. The method explained in the following relates to a method for allocating bursts in an accumulative form along a frequency axis. A method for allocating bursts along a time axis follows the same principle.

In the HARQ MAP, a MAP message may be divided into a plurality of MAP messages (e.g., HARQ MAP #1, HARQ MAP #2, . . . , HARQ MAP #N) so that each of the divided MAP messages can have information of a random burst. For instance, a MAP message #1 can include information of a burst #1, a MAP message #2 can include information of a burst #2, and a MAP message #3 can include information of bursts #3-#5.

As mentioned in the foregoing description, the OFDMA system uses the HARQ MAP to support the HARQ. Since a HARQ MAP pointer IE is included in the DL MAP, a method exists for allocating bursts sequentially along a downlink subchannel axis in the HARQ MAP if a position of the HARQ MAP is informed. A start position of a burst corresponds to a position where a previous burst ends and occupies a radio resource amounting to an allocated length from the start position, which is applied to the uplink as it is.

An ACK signal region of the uplink is informed via an ACK/NACK signal whether the transmitted data burst was successfully received. If a mobile subscriber station receives a burst at an $i^{th}$ frame, the ACK/NACK signal is sent to the ACK signal region of the uplink of an $(i+j)^{th}$ frame. A value of 'j' is sent by the UCD. In allocating the ACK signal region, one method exists for allocating the ACK signal region to the uplink for each HARQ message. Another method exists wherein at least two of a plurality of HARQ MAP messages of a frame uses one ACK signal region.

A method wherein slots of an ACK/NACK signal of a burst indicated by a HARQ MAP message is sequentially informed by deciding an HARQ ACK region of a frame as one is explained in detail as follows.

FIG. 9 is a diagram of a method for allocating an HARQ signal region in an HARQ MAP message. In an HARQ MAP message, an ACK signal region is allocated to an uplink using a start position of the ACK signal region and four kinds of information (OFDMA symbol offset, Subchannel offset, No. OFDMA Symbols, No. Subchannels). Each mobile subscriber station sequentially inputs an ACK/NACK signal to the ACK signal region (FIG. 9) allocated to the uplink for indicating whether a respective burst has been successfully received. A start position of the ACK/NACK signal corresponds to a position next to that of the previously received ACK/NACK information. A sequence of ACK/NACK signals follows a burst sequence of a downlink within the HARQ MAP message. Namely, like the sequence of bursts #1 to #7, the ACK/NACK signals within the allocated HARQ ACK region of the uplink are sent in a sequence that corresponds to the sequence of the bursts #1 to #7.

Referring to FIG. 9, a MAP message #1 includes allocation information of bursts #1 and #2, a MAP message #2 includes allocation information of bursts #3 and #4, and a MAP message #3 includes allocation information of bursts #5 to #7. Mobile subscriber station #1 (MSS #1) reads the information of the burst #1 in the contents of the MAP message #1 and then informs an initial slot within the HARQ ACK signal region indicated by an HARQ MAP message whether the transmitted data was successfully received. MSS #2 knows its position within the HARQ ACK signal region by recognizing that it is sequentially next to that of the ACK/NACK signal slot of the burst #1 within the ACK signal region (position within the HARQ ACK region is known by incrementing a count of the burst #1 within the contents of the MAP message #1). MSS #3 knows its position within the HARQ ACK region by calculating a total amount of slots of the bursts #1 and #2 of the MAP message #1. Thus, the positions within the HARQ ACK region can be sequentially known.

A mobile subscriber station should read a MAP message delivered to another mobile subscriber station to know an ACK/NACK location within an ACK signal region allocated to itself and should calculate the bursts within the message accumulatively. In doing so, if an error occurs from a previous HARQ MAP message prior to a current HARQ MAP message to be read, it is unable to find out an accurate location of a slot mapped to the burst of data within the ACK signal region. For example, if an error occurs in an HARQ MAP message #1, as shown in FIG. 10A and FIG. 10B, MSS #5, MSS #6 and MSS #7 of an HARQ MAP message #3 cannot learn the location of the slot to which the ACK/NACK signal is to be inputted within the ACK signal region. Likewise, MSS #3 and MSS #4 of an HARQ MAP message #2 cannot learn the location slot location to which the ACK/NACK signal is to be inputted either. Hence, although the error occurs in only one HARQ MAP message, all data must be retransmitted, therefore causing overhead.

FIG. 11A and FIG. 11B are exemplary diagrams for explaining an accumulative type allocation of data bursts in accordance with the related art.

Referring to FIG. 11A and FIG. 11B, a MAP message #1 includes allocation information of bursts #1 and #2 and a MAP message #2 includes allocation information of bursts #3 to #5.

An MSS #1 learns of a size and location of a burst according to the information found in the burst #1 in the contents of the MAP message #1. An MSS #2 learns of a location of a burst #2 by reading a 'duration' of the burst #1 in the contents of the MAP message #1. Accordingly, an MSS #3 learns of a location of a burst #3 by calculating a total of value of the 'duration' of the bursts #1 and #2 of the MAP message #1. Hence, the locations of all bursts can be sequentially known in the above-explained manner.

As mentioned in the above-explained description of the related art method, each mobile subscriber station (MSS) needs to read a message forwarded to another mobile subscriber station to grasp the location and size of the data burst allocated to itself and should calculate the 'duration' values within the MAP message.

However, if any error occurs in a previous MAP message, the mobile subscriber station is unable to calculate an accurate location of the burst allocated to itself. For example, if an error occurs in the MAP message #1 in FIG. 11A, it is unable to know the locations of the bursts allocated to the MSSs #3 to #5 as well as locations of the bursts allocated to the MSSs #1 and #2.

SUMMARY OF THE INVENTION

The present invention is directed to allocating data bursts and supporting hybrid automatic retransmission request (HARQ) in an OFDMA radio access system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for allocating data regions in an orthogonal frequency division multiplexing access system, the method comprising receiving a message comprising information for locating a data region of a data map allocated to a mobile station identified in the message for transmitting and receiving information, and identifying the data region of the data map allocated to the identified mobile station by reading the received message, wherein the data region is identified independent of identifying data regions of another data map.

In one aspect of the invention, the information for locating the data region comprises an accumulated value along a frequency axis from a first allocation of a first data map transmitted in a first message from a network to a last allocation of a data map transmitted in a message immediately previous to the transmission of the message when the data regions of all data maps are allocated along the frequency axis sequentially and accumulatively.

In another aspect of the invention, the information for locating the data region comprises an arbitrary point after an accumulated value along a frequency axis from a first allocation of a first data map transmitted in a first message from a network to a last allocation of a data map transmitted in a message immediately previous to the transmission of the message when the data regions of all data maps are allocated along the frequency axis sequentially and accumulatively.

In a further aspect of the invention, the information for locating the data region comprises an accumulated value along a time axis from a first allocation of a first data map transmitted in a first message from a network to a last allocation of a data map transmitted in a message immediately previous to the transmission of the message when the data regions of all data maps are allocated along the time axis sequentially and accumulatively.

In yet another aspect of the invention, the information for locating the data region comprises an arbitrary point after an accumulated value along a time axis from a first allocation of a first data map transmitted in the first message from a network to a last allocation of a data map transmitted in a message immediately previous to the transmission of the message when the data regions of all data maps are allocated along the time axis sequentially and accumulatively.

In yet a further aspect of the invention, the information for locating the data region comprises a two-dimensional coordinate value mapped on frequency and time axes.

Preferably, the message is a SUB-DL-UL MAP message.

In accordance with another embodiment of the invention, the information for locating the data region comprises a location of an ACK/NACK signal slot of an ACK/NACK region allocated to the mobile station for transmitting reception error confirmation information.

Preferably, the location of the ACK/NACK signal slot comprises an offset value from a first slot of the ACK/NACK region. Alternatively, the location of the ACK/NACK signal slot comprises a two-dimensional coordinate value mapped on frequency and time axes.

In accordance with another embodiment of the present invention, the information for locating the data region comprises a location of an ACK/NACK signal bit of an ACK/NACK bitmap allocated to the mobile station for transmitting reception error confirmation information. Preferably, the location of the ACK/NACK signal bit comprises an offset value from a first bit of the ACK/NACK bitmap.

In accordance with another embodiment of the present invention, a method for allocating data regions in an orthogonal frequency division multiplexing access system comprises allocating a data region of a data map for allowing a mobile station to transmit and receive information, and transmitting a message comprising information for allowing the mobile station identified in the message to locate the data region of the data map allocated to the mobile station, wherein the information facilitates the mobile station to identify the data region of the data map without identifying data regions of another data map.

In one aspect of the invention, the information for locating the data region comprises an accumulated value along a frequency axis from a first allocation of a first data map transmitted in a first message from a network to a last allocation of a data map transmitted in a message immediately previous to the transmission of the message when the data regions of all data maps are allocated along the frequency axis sequentially and accumulatively.

In another aspect of the invention, the information for locating the data region comprises an arbitrary point after an accumulated value along a frequency axis from a first allocation of a first data map transmitted in a first message from a network to a last allocation of a data map transmitted in a message immediately previous to the transmission of the message when the data regions of all data maps are allocated along the frequency axis sequentially and accumulatively.

In a further aspect of the invention, the information for locating the data region comprises an accumulated value along a time axis from a first allocation of a first data map transmitted in a first message from a network to a last allocation of a data map transmitted in a message immediately previous to the transmission of the message when the data regions of all data maps are allocated along the time axis sequentially and accumulatively.

In yet another aspect of the invention, the information for locating the data region comprises an arbitrary point after an accumulated value along a time axis from a first allocation of a first data map transmitted in the first message from a network to a last allocation of a data map transmitted in a message immediately previous to the transmission of the message when the data regions of all data maps are allocated along the time axis sequentially and accumulatively.

In yet a further aspect of the invention, the information for locating the data region comprises a two-dimensional coordinate value mapped on frequency and time axes.

Preferably, the message is a SUB-DL-UL MAP message.

In accordance with another embodiment of the invention, the information for locating the data region comprises a location of an ACK/NACK signal slot of an ACK/NACK region allocated to the mobile station for transmitting reception error confirmation information.

Preferably, the location of the ACK/NACK signal slot comprises an offset value from a first slot of the ACK/NACK region. Alternatively, the location of the ACK/NACK signal slot comprises a two-dimensional coordinate value mapped on frequency and time axes.

In accordance with another embodiment of the present invention, the information for locating the data region comprises a location of an ACK/NACK signal bit of an ACK/NACK bitmap allocated to the mobile station for transmitting reception error confirmation information. Preferably, the location of the ACK/NACK signal bit comprises an offset value from a first bit of the ACK/NACK bitmap.

In accordance with another embodiment of the present invention, a mobile communication device for identifying data regions in an orthogonal frequency division multiplexing access system comprises a receiver for receiving a message comprising information for locating a data region of a data map allocated to a mobile station identified in the message for transmitting and receiving information, and a processor for identifying the data region of the data map allocated to the identified mobile station by reading the received message, wherein the data region is identified independent of identifying data regions of another data map.

In one aspect of the invention, the information for locating the data region comprises an accumulated value along a frequency axis from a first allocation of a first data map transmitted in a first message from a network to a last allocation of a data map transmitted in a message immediately previous to the transmission of the message when the data regions of all data maps are allocated along the frequency axis sequentially and accumulatively.

In another aspect of the invention, the information for locating the data region comprises an arbitrary point after an accumulated value along a frequency axis from a first allocation of a first data map transmitted in a first message from a network to a last allocation of a data map transmitted in a message immediately previous to the transmission of the message when the data regions of all data maps are allocated along the frequency axis sequentially and accumulatively.

In a further aspect of the invention, the information for locating the data region comprises an accumulated value along a time axis from a first allocation of a first data map transmitted in a first message from a network to a last allocation of a data map transmitted in a message immediately previous to the transmission of the message when the data regions of all data maps are allocated along the time axis sequentially and accumulatively.

In yet another aspect of the invention, the information for locating the data region comprises an arbitrary point after an accumulated value along a time axis from a first allocation of a first data map transmitted in the first message from a network to a last allocation of a data map transmitted in a message immediately previous to the transmission of the message when the data regions of all data maps are allocated along the time axis sequentially and accumulatively.

In yet a further aspect of the invention, the information for locating the data region comprises a two-dimensional coordinate value mapped on frequency and time axes.

Preferably, the message is a SUB-DL-UL MAP message.

In accordance with another embodiment of the invention, the information for locating the data region comprises a location of an ACK/NACK signal slot of an ACK/NACK region allocated to the mobile station for transmitting reception error confirmation information.

Preferably, the location of the ACK/NACK signal slot comprises an offset value from a first slot of the ACK/NACK region. Alternatively, the location of the ACK/NACK signal slot comprises a two-dimensional coordinate value mapped on frequency and time axes.

In accordance with another embodiment of the present invention, the information for locating the data region comprises a location of an ACK/NACK signal bit of an ACK/NACK bitmap allocated to the mobile station for transmitting reception error confirmation information. Preferably, the location of the ACK/NACK signal bit comprises an offset value from a first bit of the ACK/NACK bitmap.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 10A and FIG. 10B illustrate a method for allocating an HARQ signal region in an HARQ MAP message in accordance with the related art.

FIG. 11A and FIG. 11B illustrate an accumulative type allocation of data bursts in accordance with the related art.

FIG. 12 illustrates information included in map messages in accordance with one embodiment of the present invention.

FIG. 13 illustrates information included in map messages in accordance with one embodiment of the present invention.

FIG. 14 illustrates information included in map messages in accordance with one embodiment of the present invention.

FIG. 15 illustrates information included in map messages in accordance with one embodiment of the present invention.

FIG. 16 illustrates information included in map messages in accordance with one embodiment of the present invention.

DETAILED DESCRIPTION OF THE PREFERRED EMBODIMENTS

The present invention relates to allocating data bursts and supporting hybrid automatic retransmission request (HARQ) in an OFDMA radio access system.

Reference will now be made in detail to the preferred embodiments of the present invention, examples of which are illustrated in the accompanying drawings. Wherever possible, the same reference numbers will be used throughout the drawings to refer to the same or like parts.

Figure 11B:
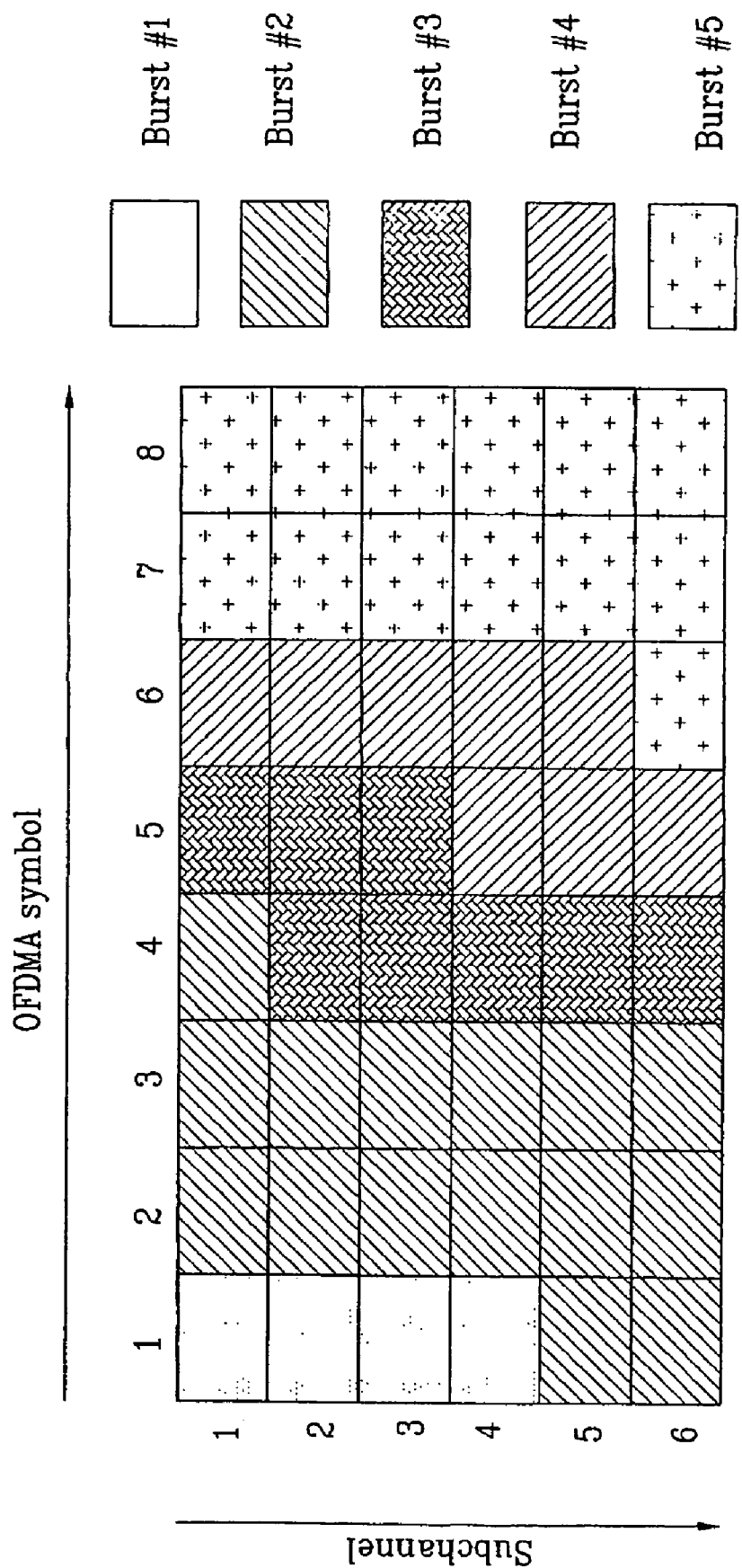

FIG. 12 illustrates information included in map messages in accordance with one embodiment of the present invention. Referring to FIG. 12, location information, such as a 'Start Offset' of a data burst is included in each MAP message to allocate downlink or uplink data bursts to mobile subscriber stations. The 'Start Offset' is information relating to a start location of a first burst of the MAP message (burst #1 in case of MAP message #1, burst #3 in case of MAP message #2) and indicates from which allocation unit the first burst of the MAP message starts. Preferably, in FIG. 12, a burst #1 amounting to four allocation units starting from a first allocation unit is allocated to an MSS #1 and a burst # 2 amounting to fifteen allocation units starting from the previous allocation unit is allocated to an MSS #2. A burst #3 amounting to eight allocation units starting from a 20th allocation unit is allocated to MSS #3. The allocation result of the data bursts for each mobile subscriber station in FIG. 12 is identical to that in FIG. 11B.

Referring to FIG. 13, location information of a data burst included in each MAP message is expressed as a 2-dimensional coordinate value on a data frame by providing two values, 'Symbol offset' and 'Subchannel offset'. Preferably, the 'Symbol offset' and 'Subchannel offset' are information relating to a start location of a first burst (burst #1 in case of MAP message #1, burst #3 in case of MAP message #2) of each message and correspond to the 2-dimensional coordinate value according to time and frequency axes on the data frame. Because 'symbol offset=4' and 'Subchannel offset=2' in MAP message #2, a start location of a burst #3 allocated to an MSS #3 is the same as the case in FIG. 11B.

Table 1 and Table 2 show that 'Start Offset' in FIG. 12 and 'Symbol offset' and 'Subchannel offset' in FIG. 13 are included in an HARQ MAP message to practically apply the technical idea of the present invention to the IEEE802.16d/e OFDMA system.

TABLE 1

| Syntax | Size (bits) | Notes |
|---|---|---|
| HARQ MAP message format( ){ | | |
| HARQ MAP Indicator = 111 | 3 | Set to 0b11 |
| HARQ UL-MAP appended | 1 | |
| CRC appended | 1 | |
| MAP message length | 9 | Length of HARQ MAP in bytes |
| DL IE count | 6 | Number of DL IE in the burst |
| Start offset | 16 | |
| For (I=0; I<DL IE count; I++){ | | |
| Compact DL-MAP IE( ) | variable | |
| } | | |
| If (Compact UL-MAP appended ==1){ | | |
| Start offset | 16 | |
| While (map data remains){ | | |
| Compact UL-MAP IE( ) | variable | |
| } | | |
| } | | |
| If !(byte boundary){ | | |
| Padding nibble | 4 | |
| } | | |
| } | | |

TABLE 2

| Syntax | Size (bits) | Notes |
|---|---|---|
| Symbol offset | 8 | |
| Subchannel offset | 8 | |

Table 3 and Table 4 show formats for including 'Start Offset' or 'Symbol offset' & 'Subchannel offset' according to a form 'DL-MAP_IE' in an HARQ MAP message to practically apply the technical idea of the present invention to the IEEE802.16d/e OFDMA system. The 'Start Offset' and 'Symbol offset' & 'Subchannel offset' in Table 3 and Table 4 indicate a start location of a first downlink data burst in the HARQ MAP message.

TABLE 3

| Syntax | Size (bits) | Notes |
|---|---|---|
| Start_Offset_Compact DL-MAP IE( ){ | | |
| DL-MAP Type = 7 | 3 | |

TABLE 3-continued

| Syntax | Size (bits) | Notes |
|---|---|---|
| DL-MAP sub-type | 5 | Extension sub type = 3 |
| Length | 4 | Length of the IE bytes |
| Start Offset | 16 | Start location the first burst in following DL-MAP IE |
| Reserved | 4 | |
| } | | |

TABLE 4

| Syntax | Size (bits) | Notes |
|---|---|---|
| Start_Offset_Compact DL-MAP IE( ){ | | |
| DL-MAP Type = 7 | 3 | |
| DL-MAP sub-type | 5 | Extension sub type = 3 |
| Length | 4 | Length of the IE bytes |
| Symbol Offset | 8 | Start location along symbol the first burst in following DL-MAP IE |
| Subchannel Offset | 8 | Start location along subchannel the first burst in following DL-MAP IE |
| Reserved | 4 | |
| } | | |

Table 5 and Table 6 show formats for including 'Start Offset' or 'Symbol offset' & 'Subchannel offset' according to a form 'UL-MAP_IE' in an HARQ MAP message to practically apply the technical idea of the present invention to the IEEE802.16d/e OFDMA system. The 'Start Offset' and 'Symbol offset' & 'Subchannel offset' in Table 3 and Table 4 indicate a start location of a first uplink data burst in the HARQ MAP message.

TABLE 5

| Syntax | Size (bits) | Notes |
|---|---|---|
| Start_Offset_Compact UL-MAP IE( ){ | | |
| UL-MAP Type = 7 | 3 | |
| UL-MAP sub-type | 5 | Extension sub type = 3 |
| Length | 4 | Length of the IE bytes |
| Start Offset | 16 | Start location the first burst in following UL-MAP IE |
| Reserved | 4 | |
| } | | |

TABLE 6

| Syntax | Size (bits) | Notes |
|---|---|---|
| Start_Offset_Compact UL-MAP IE( ){ | | |
| UL-MAP Type = 7 | 3 | |
| UL-MAP sub-type | 5 | Extension sub type = 3 |
| Length | 4 | Length of the IE bytes |
| Symbol Offset | 8 | Start location along symbol the first burst in following UL-MAP IE |
| Subchannel Offset | 8 | Start location along subchannel the first burst in following UL-MAP IE |
| Reserved | 4 | |
| } | | |

Table 7 shows a format in case that Tables 3 to 6 are included in the HARQ MAP message.

TABLE 7

| Syntax | Size (bits) | Notes |
|---|---|---|
| HARQ MAP message format( ){ | | |
| ... | | |
| For(I=0; I<DL IE count; I++){ | | |
| Compact DL-MAP IE( ) | variable | One of compact DL-MAP IE's may be Start_Offset_Compact_DL-MAP_IE( ) |
| } | | |
| ... | | |
| If(Compact UL-MAP appended==1){ While(map data remains){ | | |
| Compact UL-MAP IE( ) | variable | One of compact UL-MAP IE's may be Start_Offset_Compact_UL-MAP_IE( ) |
| } | | |
| } | | |
| } | | |

A mobile subscriber station receives an MAP message including location information of uplink or downlink data burst allocated to itself to learn a location of the uplink or downlink data burst from the location information, to acquire data transmitted via the downlink data burst, and to transmit data via the uplink data burst.

In the related art method, each mobile subscriber station must read the MAP message forwarded to another mobile subscriber station to learn the location and size of the data burst allocated to itself and should calculate the 'duration' values within the MAP message accumulatively. If error occurs in any one of the previous MAP messages in the due process, the corresponding mobile subscriber station is unable to grasp the accurate location of the burst allocated to itself.

However, in the present invention, each mobile subscriber station does not need to read the MAP message forwarded to another mobile subscriber station but reads the MAP message forwarded to itself to grasp the location and size of the downlink or uplink data burst allocated to itself.

Accordingly, by configuring a message for allocating a data burst to a mobile subscriber station to be independent from other messages, the present invention reduces the trouble caused to the mobile subscriber station in checking previous messages to learn the locations of the uplink and downlink data bursts allocated to itself and reduces the possibility of error occurring.

In accordance with another embodiment, the present invention provides a method of inserting information indicating location information, such as 'transmission location information' within an ACK signal region via a mobile subscriber station (MSS), to which a first data burst included in an HARQ MAP message transmitted to allocate data bursts to a plurality of mobile subscriber stations is allocated, will transmit an ACK or NACK signal for providing reception error confirmation information for the data burst.

Figure 9:
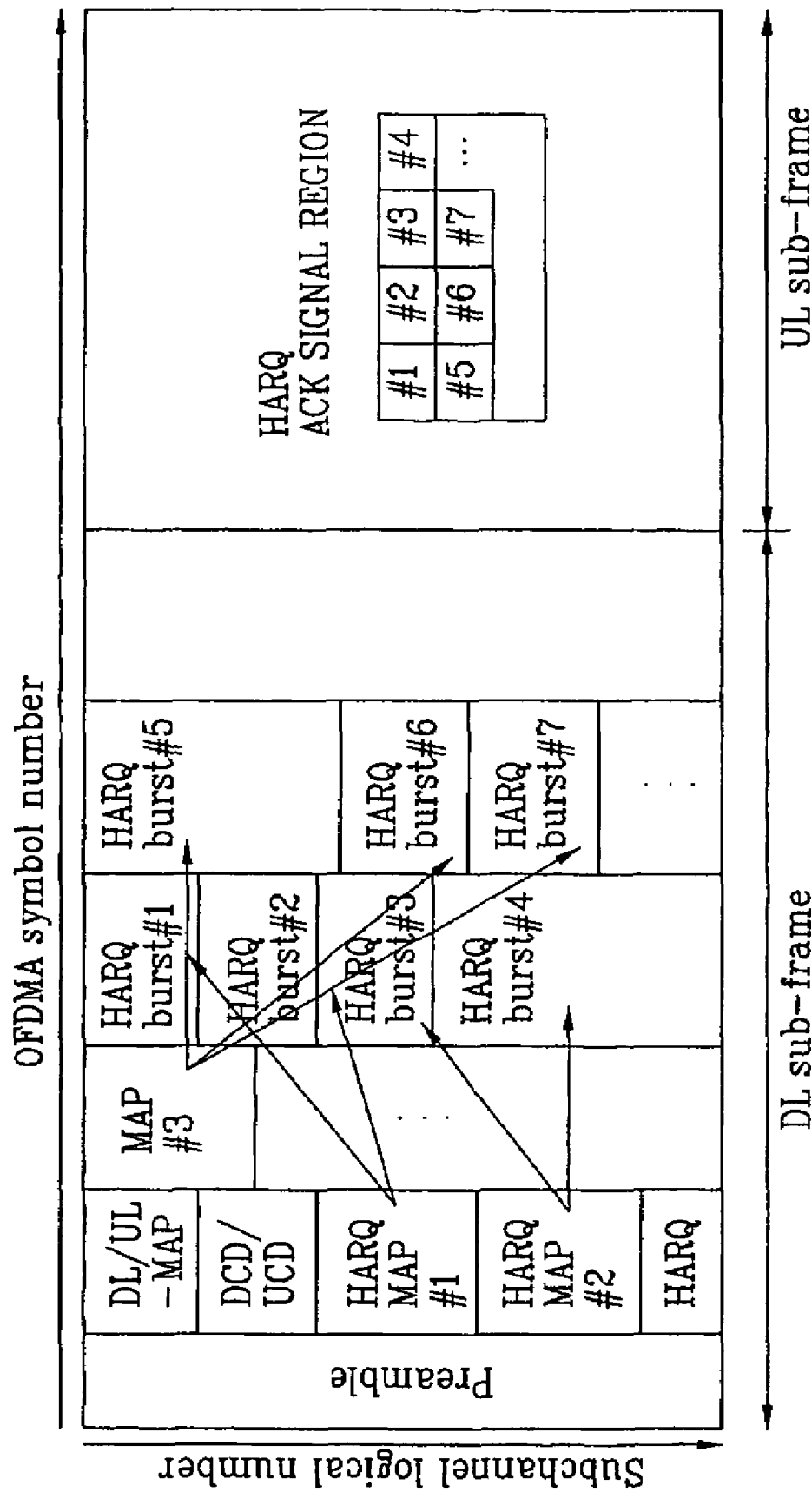
FIG. 9 illustrates a method for allocating an HARQ signal region in an HARQ MAP message in accordance with the related art.
Figure 10B:
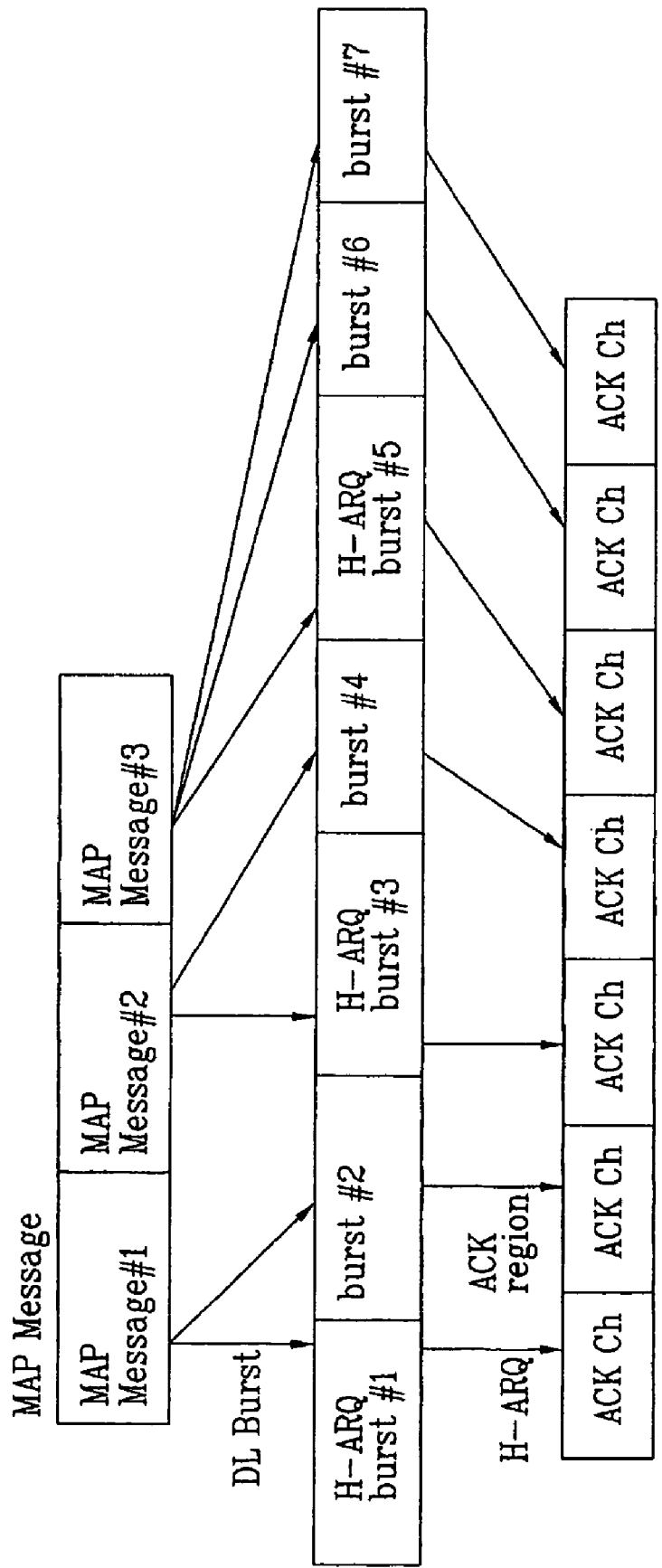

FIG. 14 illustrates information included in map messages in accordance with one embodiment of the present invention. Referring to FIG. 14, an 'ACK offset' refers to location information of a slot within an ACK signal region via which a mobile subscriber station having a first data burst, which is included in each HARQ MAP message, allocated thereto will transmit an ACK or NACK signal as reception error confirmation information for the data burst. For example, because the 'ACK Offset' equals 3 in a MAP message #2, an MSS #3 having a burst #3 allocated thereto can transmit an ACK or NACK signal, for a data burst received from a base station in a corresponding frame, to the base station via a third slot from an initial start location of an ACK signal region (cf. FIG. 9). An MSS #4 can transmit an ACK or NACK signal via a fourth slot from the initial start location of the ACK signal region.

FIG. 15 illustrates information included in map messages in accordance with one embodiment of the present invention. Referring to FIG. 15, a 'Burst Number' is a burst number indicating location information of a slot within an ACK signal region via which a mobile subscriber station having a first data burst, which is included in each HARQ MAP message, allocated thereto will transmit an ACK or NACK signal as reception error confirmation information for the data burst. For example, because the 'Burst Number' in a MAP message #3 is 5, an MSS #5 having a burst #5 allocated thereto can transmit an ACK or NACK signal, for a data burst received from a base station in a corresponding frame, to the base station via a fifth slot from an initial start location of the ACK signal region (cf. FIG. 9).

FIG. 16 illustrates information included in map messages in accordance with one embodiment of the present invention. Referring to FIG. 16, location information of a slot within an ACK signal region, via which a mobile subscriber station having a first data burst, which is included in each HARQ MAP message, allocated thereto will transmit an ACK or NACK signal as reception error confirmation information for the data burst, is expressed in 2-dimensional coordinates such as 'Symbol Offset' and 'Half subchannel offset' in an uplink subframe in which the mobile subscriber station transmits the ACK or NACK.

Table 8 shows an example of a mobile subscriber station being informed of the 'ACK Offset' in FIG. 14 by inserting Compact UL-MAP IE (UL-MAP Type=6) in an HARQ MAP message to practically apply the technical idea of the present invention to the IEEE802.16d/e OFDMA system.

TABLE 8

| Syntax | Size (bits) | Notes |
|---|---|---|
| Compact UL-MAP IE( ) | | |
| UL-MAP Type = 6 | 3 | |
| Length | 4 | Length of the IE bytes |
| ACK Offset | 8 | Start location of the first burst's ACK |
| } | | |

Table 9 shows an example of a mobile subscriber station being informed of the 'Burst Number' in FIG. 15 by inserting Compact UL-MAP IE (UL-MAP Type=6) in an HARQ MAP message to practically apply the technical idea of the present invention to the IEEE802.16d/e OFDMA system.

TABLE 9

| Syntax | Size (bits) | Notes |
|---|---|---|
| Compact UL-MAP IE( ) | | |
| UL-MAP Type = 6 | 3 | |
| Length | 4 | Length of the IE bytes |
| Burst Number | 8 | The number of burst |
| } | | |

Table 10 shows an example of a mobile subscriber station being informed of the 'Symbol Offset' and the 'Half subchannel offset' in FIG. 16 by inserting Compact UL-MAP IE (UL-MAP Type=6) in an HARQ MAP message to practically apply the technical idea of the present invention to the IEEE802.16d/e OFDMA system.

TABLE 10

| Syntax | Size (bits) | Notes |
| --- | --- | --- |
| Compact UL-MAP IE( ) | | |
| UL-MAP Type = 6 | 3 | |
| Length | 4 | Length of the IE bytes |
| Symbol Offset | 8 | Start location along symbol of the first burst's ACK signal in following Compact UL-MAP IE |
| Half subchannel offset | 8 | Start location along subchannel of the first burst's ACK signal in following Compact UL-MAP IE |
| reserved | 4 | |
| } | | |

Tables 11 to 13 show examples of a mobile subscriber station being informed of the 'ACK Offset', 'Burst Number', and 'Symbol Offset' and 'Half subchannel offset' by inserting in an HARQ MAP message using a UL-MAP_IE extension type Compact UL-MAP IE (UL-MAP Type=7) to practically apply the technical idea of the present invention to the IEEE802.16d/e OFDMA system, respectively.

TABLE 11

| Syntax | Size (bits) | Notes |
| --- | --- | --- |
| Start_Offset_Compact UL-MAP IE( ){ | | |
| UL-MAP Type = 7 | 3 | |
| UL-MAP sub-type | 5 | Extension sub type = 3 |
| Length | 4 | Length of the IE bytes |
| ACK Offset | 8 | Start location of the first burst's ACK signal in following Compact UL-MAP IE |
| reserved | 4 | |
| } | | |

TABLE 12

| Syntax | Size (bits) | Notes |
| --- | --- | --- |
| Start_Offset_Compact UL-MAP IE( ){ | | |
| UL-MAP Type = 7 | 3 | |
| UL-MAP sub-type | 5 | Extension sub type = 3 |
| Length | 4 | Length of the IE bytes |
| Burst Number | 8 | The number of burst |
| Reserved | 4 | |
| } | | |

TABLE 13

| Syntax | Size (bits) | Notes |
| --- | --- | --- |
| Start_Offset_Compact UL-MAP IE( ){ | | |
| UL-MAP Type = 7 | 3 | |
| UL-MAP sub-type | 5 | Extension sub type = 3 |
| Length | 4 | Length of the IE bytes |
| Symbol Offset | 8 | Start location along symbol of the first burst's ACK signal in following Compact UL-MAP IE |

TABLE 13-continued

| Syntax | Size (bits) | Notes |
| --- | --- | --- |
| Half subchannel offset | 9 | Start location along subchannel of the first burst's ACK signal in following Compact UL-MAP IE |
| Reserved | 3 | |
| } | | |

A mobile subscriber station receives a message including transmission location information of reception error confirmation information (ACK or NACK signal) for a data burst transmitted to the mobile subscriber station, and transmits the ACK or NACK signal via a slot within an ACK signal region allocated to itself by the transmission location information according to a reception error confirmation result of the data burst.

Figure 17:
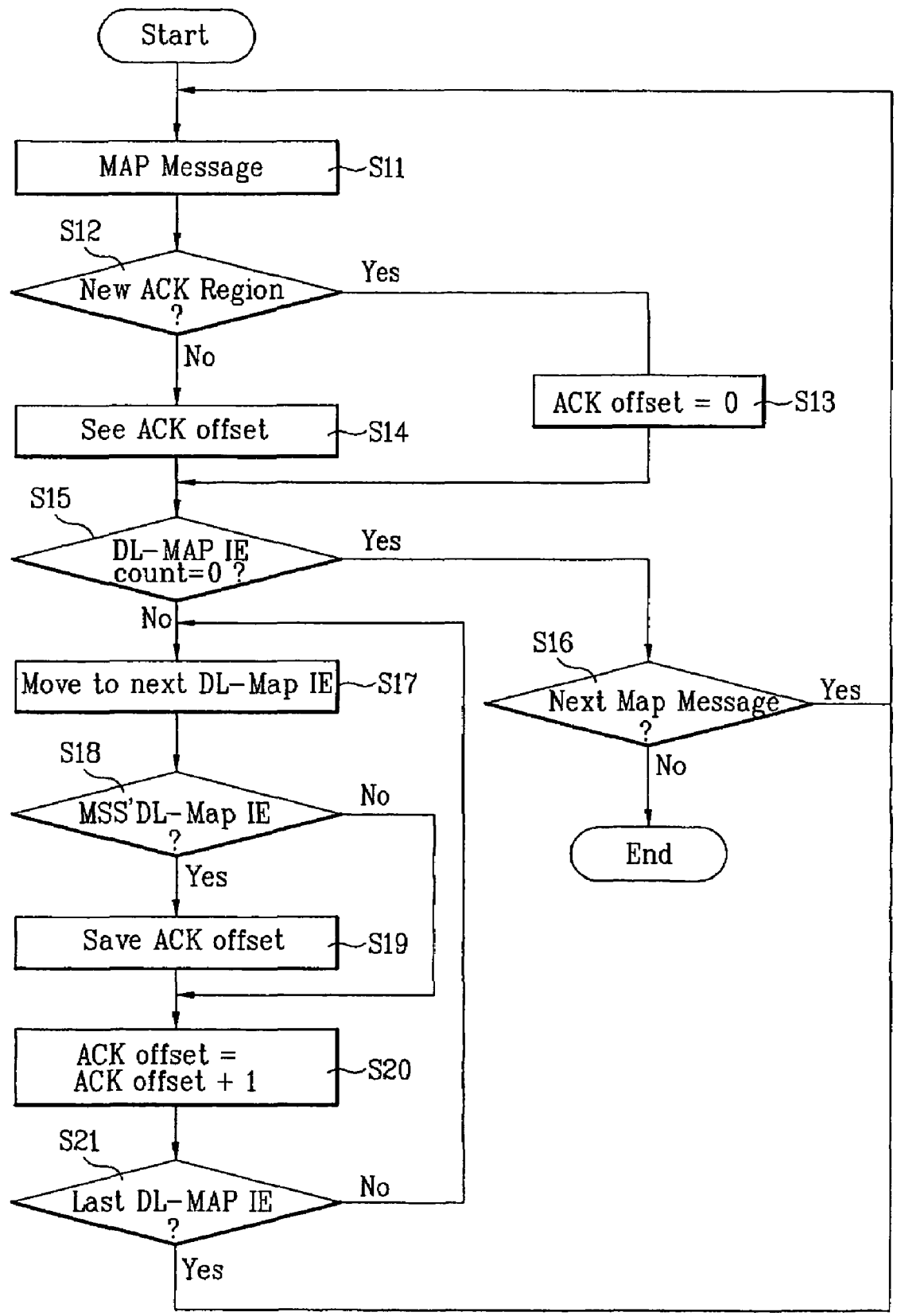
FIG. 17 is a flowchart illustrating process for deciding an ACK signal region allocated to a mobile subscriber station by receiving an MAP message in accordance with one embodiment of the present invention.

FIG. 17 is a flowchart illustrating process for deciding an ACK signal region allocated to a mobile subscriber station by receiving an MAP message in accordance with one embodiment of the present invention. Referring to FIG. 17, a mobile subscriber station checks MAP messages included in a received data frame one-by-one (S11). The mobile subscriber station then decides whether the currently checked MAP message defines a new ACK signal region (S12).

If the currently checked MAP message defines the new ACK signal region, the mobile subscriber station sets 'ACK offset' to 0 to start (S13). Otherwise, the mobile subscriber station reads the current 'ACK offset' (S14).

The mobile subscriber station then decides whether the MAP message includes DL MAP IE (S15). If the MAP message does not include the DL MAP IE (count=0), the mobile subscriber station checks a next MAP message (S16). If the MAP message includes the DL MAP IE, the mobile subscriber station checks the included DL-MAP IE one by one (S17).

The mobile subscriber station then checks whether the checked DL-MAP IE is allocated to itself (S18). If the checked DL-MAP IE is allocated to itself, the mobile subscriber station stores the 'ACK offset' (S19) and adds 1 to the 'ACK offset' (S20).

The mobile subscriber station then decides whether the corresponding DL-MAP IE is a last one (S21). If the corresponding DL-MAP IE is the last one, the mobile subscriber station checks a next MAP message included in the received data frame from the step S11 again. If the corresponding DL-MAP IE is not the last one, the mobile subscriber station checks a next DL-MAP IE from the step S17.

In the related art method, each mobile subscriber station needs to read the MAP message forwarded to another mobile subscriber station to acquire the ACK or NACK signal transmission location information allocated to itself. In case that error occurs in any one of the previous messages in the corresponding process, the mobile subscriber station is unable to know the transmission location information allocated to itself.

However, in the present invention, each mobile subscriber station does not need to read the MAP message forwarded to another mobile subscriber station. Rather, it reads the MAP message forwarded to itself to acquire the transmission location information allocated to itself.

Accordingly, by configuring a message for allocating a data burst to a mobile subscriber station to be independent from other messages, the present invention can indicate an ACK or NACK signal for data bursts of errorless MAP messages if one MAP message is erroneous. Hence, the present invention can reduce overhead in re-sending all data, can transmit the erroneous data separately, and can transmit the errorless data continuously.

Although the present invention is described in the context of mobile communication, the present invention may also be used in any wireless communication systems using mobile devices, such as PDAs and laptop computers equipped with wireless communication capabilities.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Figure 1A:
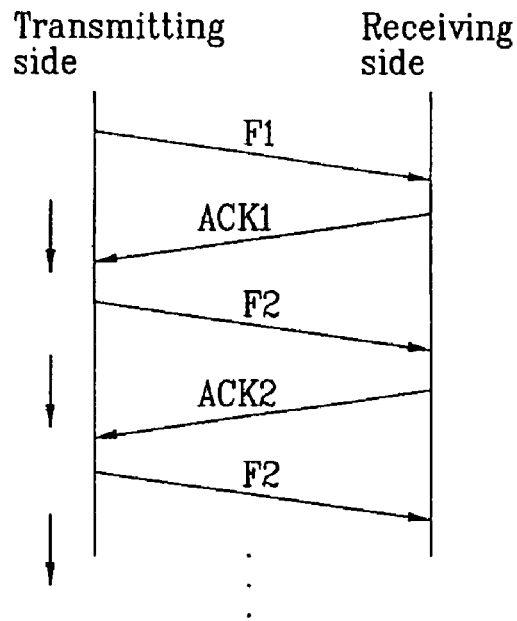
FIGS. 1A to 1C illustrate different types of automatic repeat request (ARQ) systems in accordance with the related art.
Figure 1B:
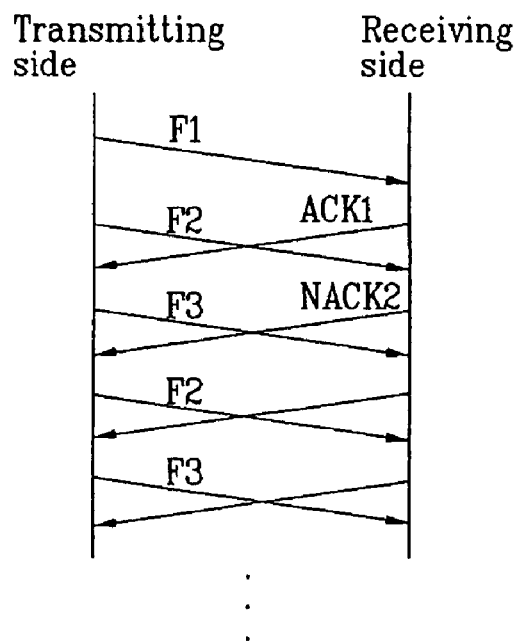
Figure 1C:
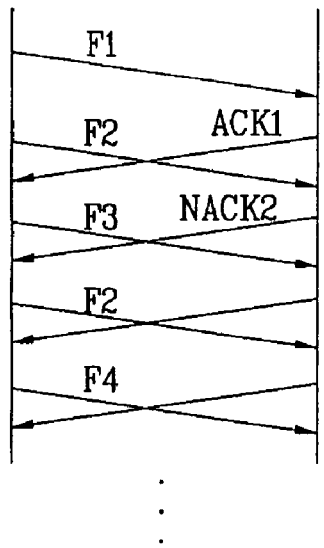
Figure 2:
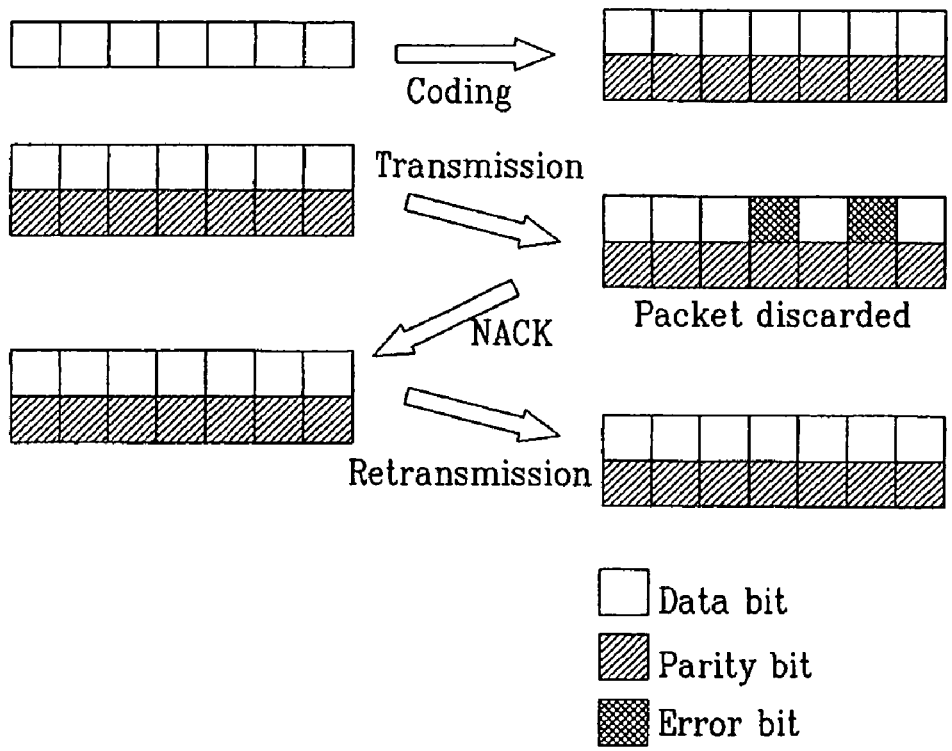
FIGS. 2 to 5 illustrate the features of the different types of ARQ systems in accordance with the related art.
Figure 3:
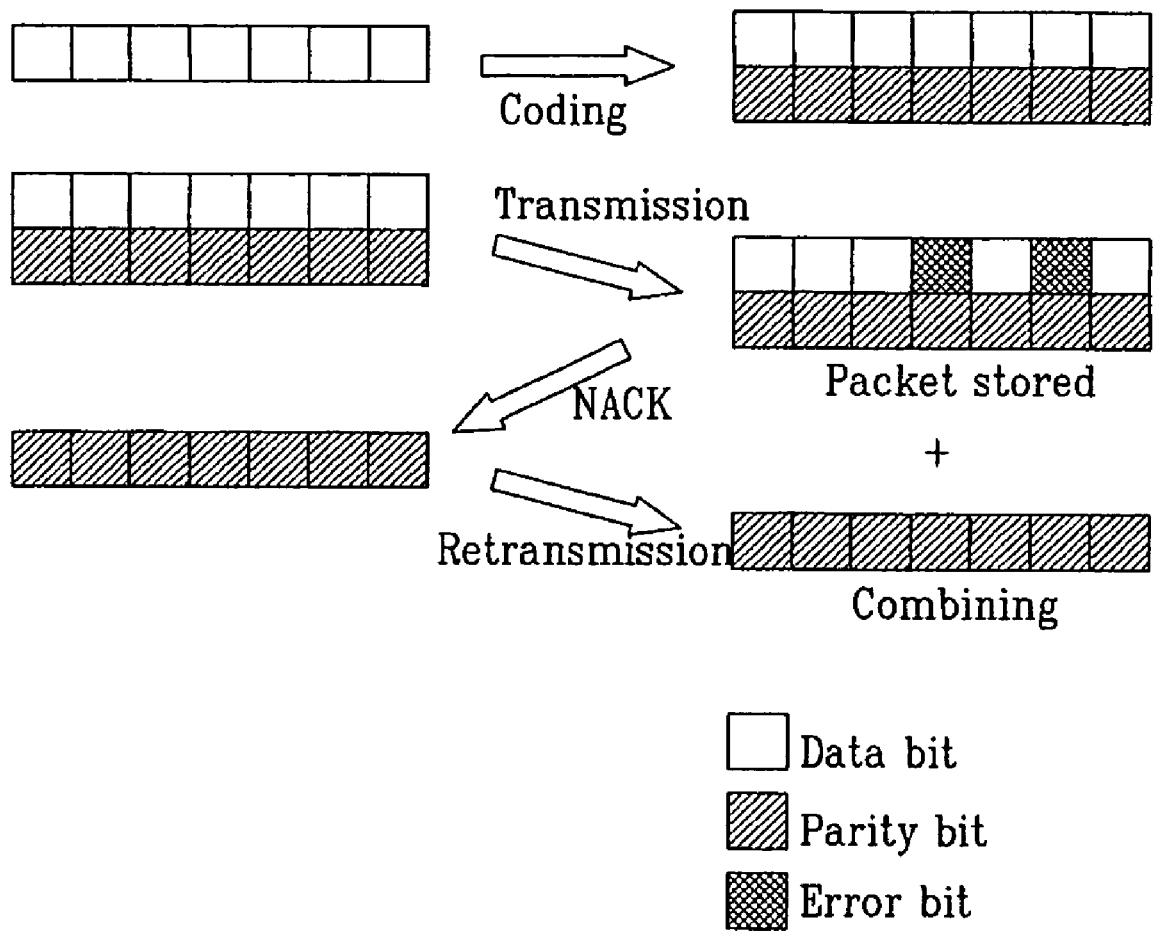
Figure 4:
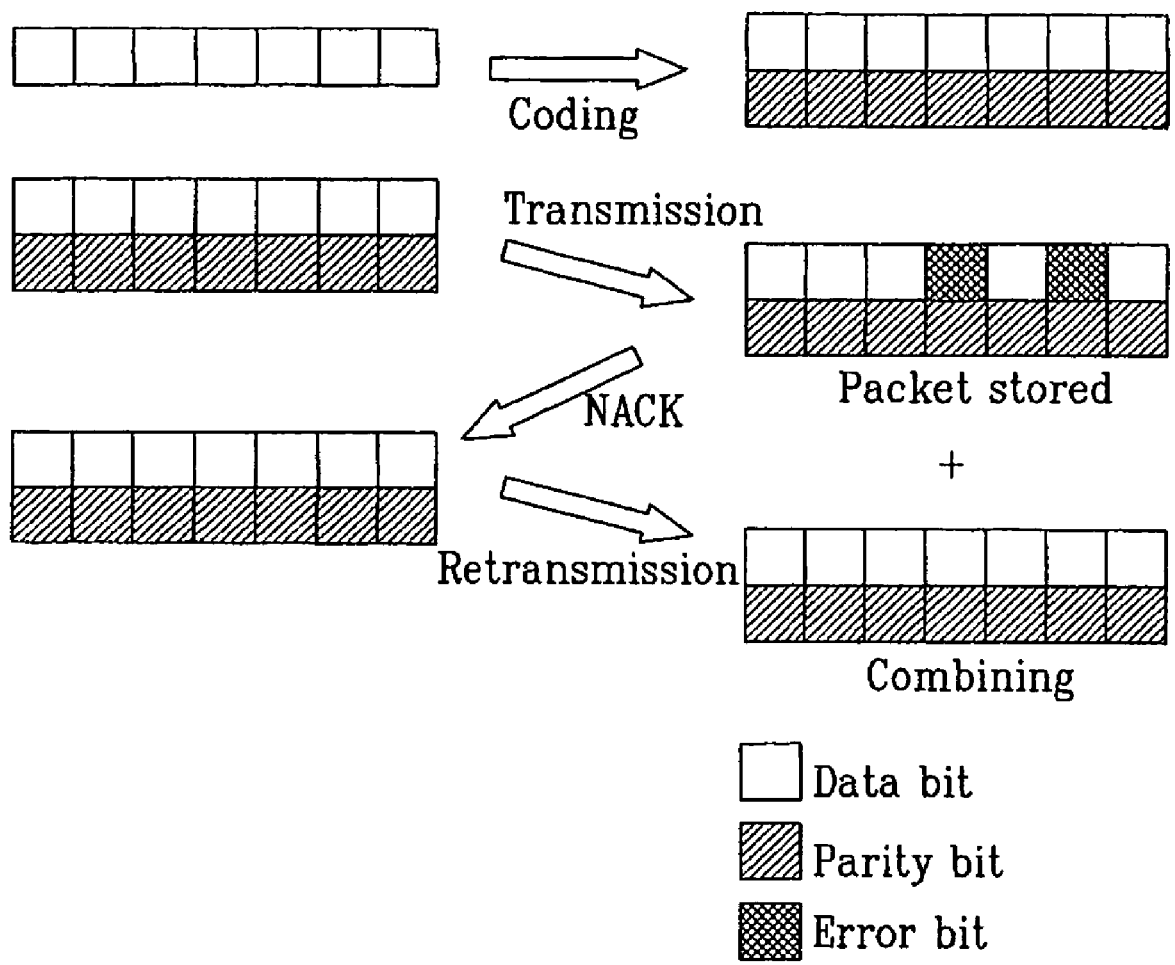
Figure 5:
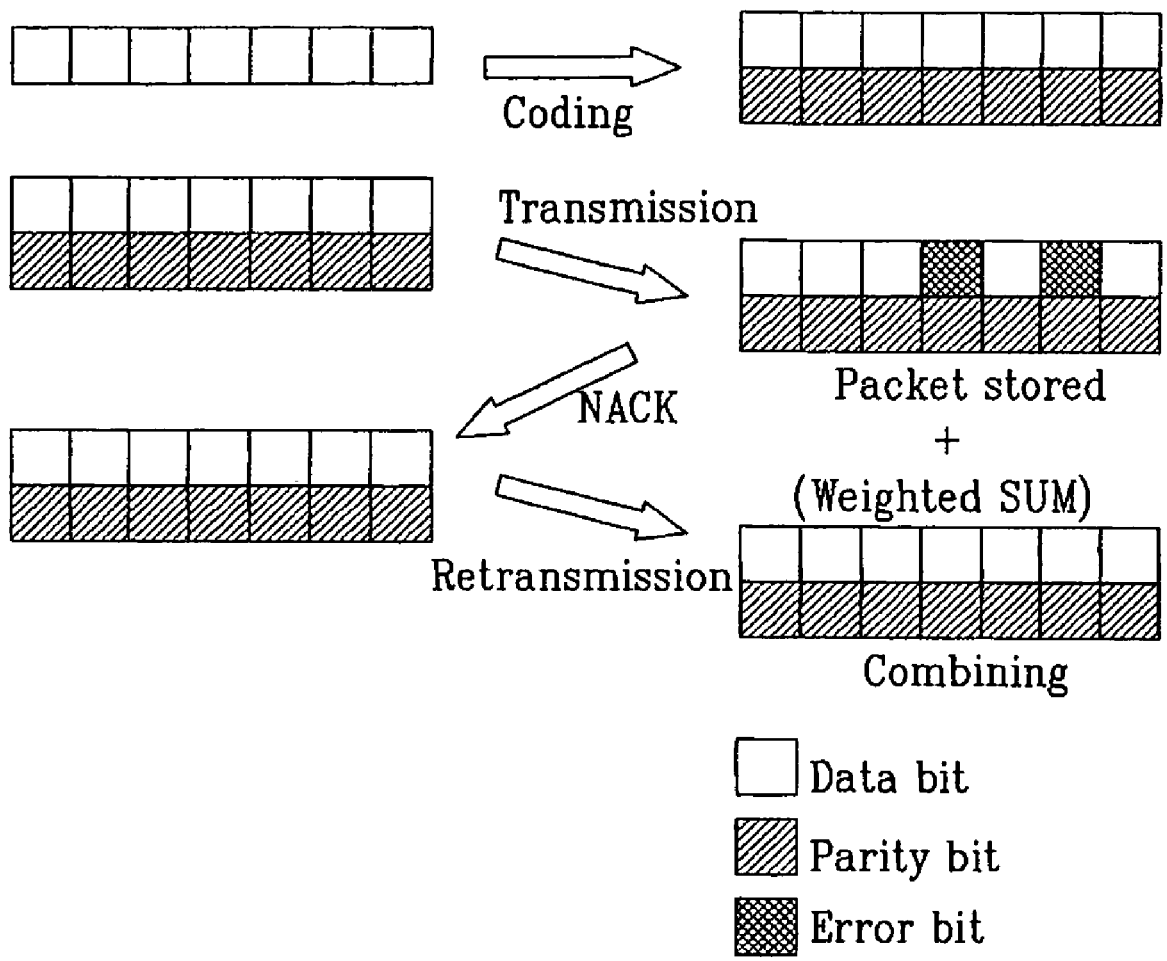
Figure 6:
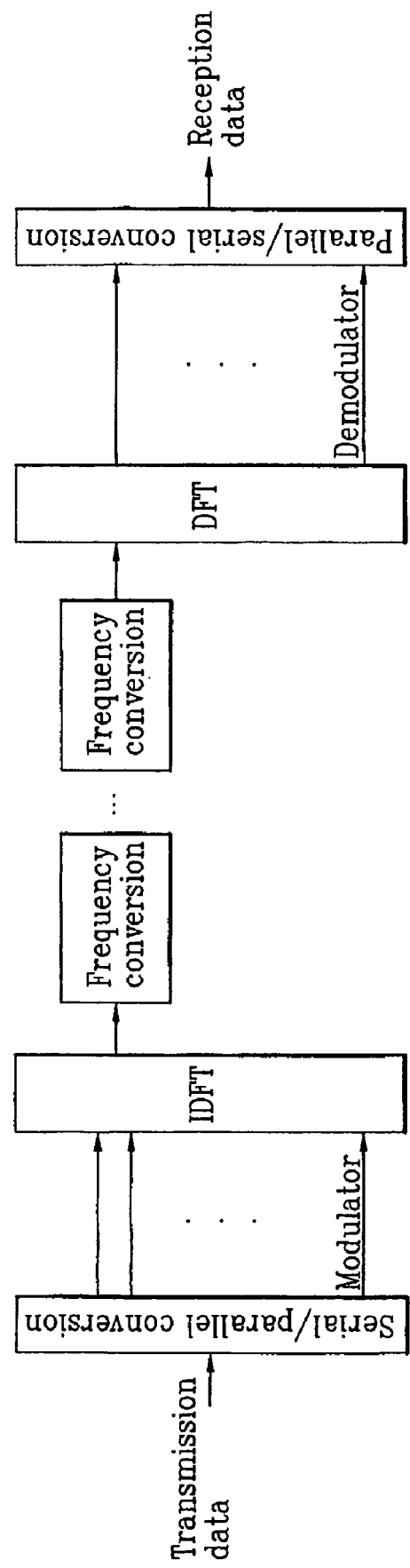
FIG. 6 illustrates a configuration of an orthogonal frequency division multiplexing (OFDM) modulator/demodulator.
Figure 7:
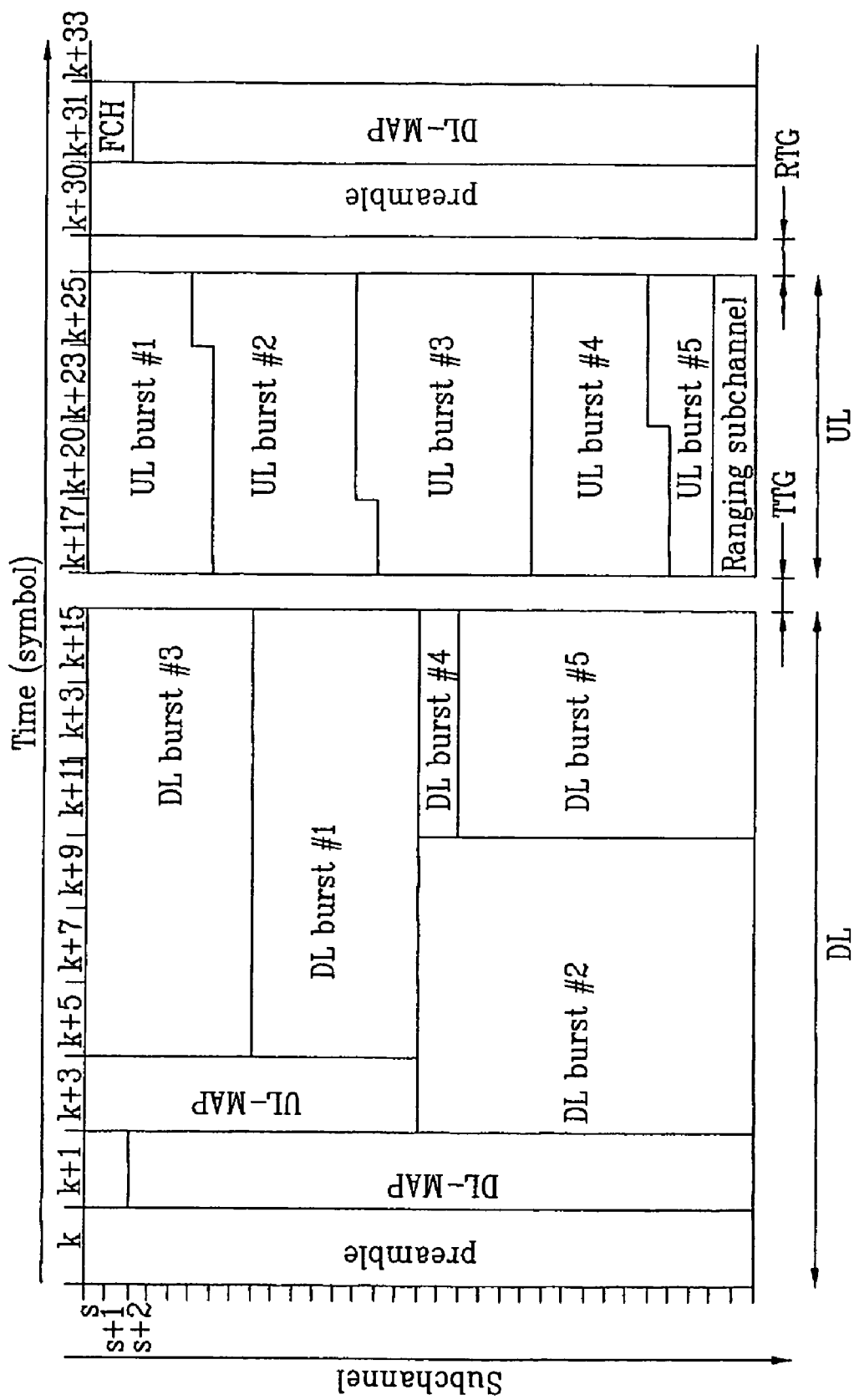
FIG. 7 illustrates a data frame in an orthogonal frequency division multiplexing access (OFDMA) radio communication system in accordance with the related art.
Figure 8:
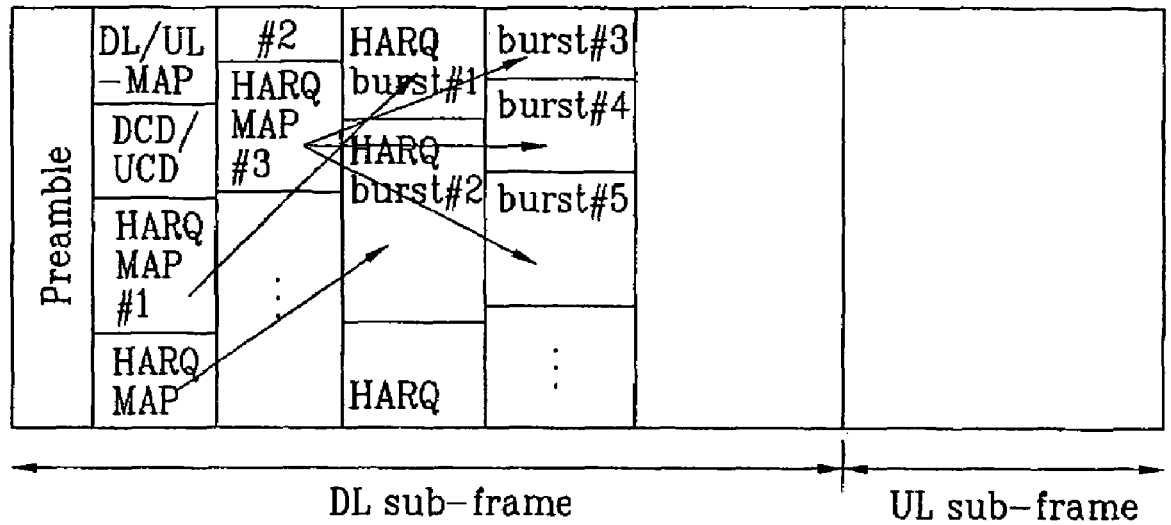
FIG. 8 illustrates a data frame allocating an HARQ burst in accordance with the related art.

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art. Preferably, the present invention may be embodied in a mobile communication device comprising the processor described above along with the components described in FIG. 6.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for supporting a hybrid automatic retransmission request (HARQ) scheme at a mobile station in an orthogonal frequency division multiplexing access system, the method comprising:

receiving a MAP message from a base station, the MAP message comprising first location information indicating a location of a downlink data region on which a downlink data burst is to be received and second location information used for identifying a location of an ACK/NACK signal slot on which an ACK or NACK signal is to be transmitted in response to the downlink data burst, the ACK/NACK signal slot being located within an ACK/NACK region, which is an uplink region allocated by the base station; and transmitting the ACK or NACK signal on the ACK/NACK signal slot based on the second location information in response to the downlink data burst received on the downlink data region indicated by the first location information.

2. The method of claim 1, wherein the first location information comprises an accumulated value along a frequency axis from a first allocation of the MAP message.

3. The method of claim 1, wherein the first location information comprises an accumulated value along a time axis from a first allocation of the MAP message.

4. The method of claim 1, wherein the first location information comprises a two-dimensional coordinate value mapped on frequency and time axes.

5. The method of claim 1, wherein the MAP message is a SUB-DL-UL MAP message.

6. The method of claim 1, wherein the second location information comprises an offset value from a first slot of the ACK/NACK region.

7. The method of claim 6, wherein the offset value is for a first downlink data burst among at least one downlink data burst specified in the MAP message.

8. The method of claim 1, wherein the second location information comprises a two-dimensional coordinate value mapped on frequency and time axes.

9. A mobile communication device supporting a hybrid automatic retransmission request (HARQ) scheme in an orthogonal frequency division multiplexing access system, the mobile communication device comprising:

a receiver for receiving a MAP message from a base station, the MAP message comprising first location information indicating a location of a downlink data region on which a downlink data burst is to be received and second location information used for identifying a location of an ACK/NACK signal slot on which an ACK or NACK signal is to be transmitted in response to the downlink data burst, the ACK/NACK signal slot being located within an ACK/NACK region, which is an uplink region allocated by the base station; and a transmitter for transmitting the ACK or NACK signal on the ACK/NACK signal slot based on the second location information in response to the downlink data burst received on the downlink data region indicated by the first location information.

10. The mobile communication device of claim 9, wherein the first location information comprises a two-dimensional coordinate value mapped on frequency and time axes.

11. The mobile communication device of claim 9, wherein the MAP message is a SUB-DL-UL MAP message.

12. The mobile communication device of claim 9, wherein the second location information comprises an offset value from a first slot of the ACK/NACK region.

13. The mobile communication device of claim 9, wherein the second location information comprises a two-dimensional coordinate value mapped on frequency and time axes.

14. The mobile communication device of claim 12, wherein the offset value is for a first downlink data burst among at least one downlink data burst specified in the MAP message.

* * * * *